(12) United States Patent
Hoshino et al.

(10) Patent No.: US 11,514,581 B2
(45) Date of Patent: Nov. 29, 2022

(54) IMAGE CAPTURING DEVICE, IMAGE CAPTURING METHOD, AND IMAGE CAPTURING SYSTEM

(71) Applicant: SONY SEMICONDUCTOR SOLUTIONS CORPORATION, Kanagawa (JP)

(72) Inventors: Kazuhiro Hoshino, Kanagawa (JP); Takahiro Iinuma, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 195 days.

(21) Appl. No.: 16/761,728

(22) PCT Filed: Aug. 23, 2018

(86) PCT No.: PCT/JP2018/031126
§ 371 (c)(1),
(2) Date: May 5, 2020

(87) PCT Pub. No.: WO2019/097797
PCT Pub. Date: May 23, 2019

(65) Prior Publication Data
US 2020/0342607 A1 Oct. 29, 2020

(30) Foreign Application Priority Data
Nov. 14, 2017 (JP) .............................. JP2017-218999

(51) Int. Cl.
*G06T 7/20* (2017.01)
*H04N 19/137* (2014.01)
(Continued)

(52) U.S. Cl.
CPC .............. *G06T 7/20* (2013.01); *H04N 5/2353* (2013.01); *H04N 7/013* (2013.01); *H04N 19/137* (2014.11)

(58) Field of Classification Search
CPC ........ G06T 7/20; H04N 5/2353; H04N 7/013; H04N 19/137; H04N 5/23241;
(Continued)

(56) References Cited

U.S. PATENT DOCUMENTS 6,410,900 B1 6/2002 Okamoto
6,452,153 B1 9/2002 Lauxtermann et al.
(Continued)

FOREIGN PATENT DOCUMENTS

CN 1509071 A 6/2004
CN 101346987 A 1/2009
(Continued)

OTHER PUBLICATIONS

International Search Report and Written Opinion of PCT Application No. PCT/JJP2018/031126, dated Nov. 6, 2018, 10 pages of ISRWO.

(Continued)

*Primary Examiner* — Lin Ye
*Assistant Examiner* — Tuan H Le
(74) *Attorney, Agent, or Firm* — Chip Law Group

(57) ABSTRACT

Provided is an image capturing device including a motion determination unit that determines the presence/absence of motion in a plurality of pixels on the basis of an addition signal of the plurality of pixels to obtain a motion determination result, and a transmission control unit that controls whether or not to transmit image data corresponding to at least the plurality of pixels on the basis of the motion determination result.

17 Claims, 13 Drawing Sheets

(51) Int. Cl.
*H04N 5/235* (2006.01)
*H04N 7/01* (2006.01)

(58) Field of Classification Search
CPC .. H04N 5/23245; H04N 5/341; H04N 5/3745; H04N 5/37455; H04N 5/343; H04N 5/3698; H04N 5/378; H04N 5/347
See application file for complete search history.

(56) References Cited

U.S. PATENT DOCUMENTS

| | | | |
|---|---|---|---|
| 7,030,911 | B1 | 4/2006 | Kubo |
| 10,484,606 | B1 | 11/2019 | Karpenko |
| 2003/0107648 | A1 | 6/2003 | Stewart et al. |
| 2004/0179110 | A1 | 9/2004 | Hashimoto |
| 2006/0203903 | A1 | 9/2006 | Shih et al. |
| 2007/0092244 | A1 | 4/2007 | Pertsel et al. |
| 2009/0256921 | A1 | 10/2009 | Pertsel et al. |
| 2011/0280541 | A1 | 11/2011 | Lee |
| 2014/0022427 | A1 | 1/2014 | Goto et al. |
| 2015/0201152 | A1* | 7/2015 | Cho ............... H04N 9/8042 382/103 |
| 2015/0281580 | A1 | 10/2015 | Karpenko |
| 2015/0319341 | A1* | 11/2015 | Sekine ............ H04N 5/374 348/64 |
| 2015/0381891 | A1 | 12/2015 | Karpenko |
| 2017/0212408 | A1 | 7/2017 | Ma et al. |
| 2017/0230592 | A1 | 8/2017 | Goto et al. |
| 2017/0257571 | A1 | 9/2017 | Karpenko |

FOREIGN PATENT DOCUMENTS

| | | | |
|---|---|---|---|
| CN | 101547315 | A | 9/2009 |
| CN | 103581579 | A | 2/2014 |
| CN | 104782111 | A | 7/2015 |
| CN | 105450936 | A | 3/2016 |
| DE | 102005053503 | A1 | 9/2006 |
| EP | 1102323 | A1 | 5/2001 |
| EP | 1949672 | A2 | 7/2008 |
| EP | 2913994 | A1 | 9/2015 |
| EP | 3133439 | A1 | 2/2017 |
| GB | 2424337 | A | 9/2006 |
| JP | 2000-261728 | A | 9/2000 |
| JP | 2000-316127 | A | 11/2000 |
| JP | 3430994 | B2 | 7/2003 |
| JP | 3449468 | B2 | 9/2003 |
| JP | 2004-200739 | A | 7/2004 |
| JP | 2006-262433 | A | 9/2006 |
| JP | 5276444 | B2 | 8/2013 |
| JP | 2014-090394 | A | 5/2014 |
| JP | 5604700 | B2 | 10/2014 |
| JP | 2014-209696 | A | 11/2014 |
| JP | 2016-208116 | A | 12/2016 |
| JP | 6502597 | B2 | 4/2019 |
| KR | 10-2008-0059462 | | 6/2008 |
| KR | 10-1052207 | B1 | 7/2011 |
| KR | 10-2015-0081298 | A | 7/2015 |
| TW | I298155 | B | 6/2008 |
| WO | 2007/097808 | A2 | 8/2007 |
| WO | 2014/069212 | A1 | 5/2014 |
| WO | 2015/180268 | A1 | 12/2015 |

OTHER PUBLICATIONS

Extended European Search Report of EP Application No. 18878084.5, dated Jul. 24, 2020, 14 pages.

Office Action for CN Patent Application No. 201880072103.5, dated Jun. 21, 2021, 11 pages of English Translation and 10 pages of Office Action.

* cited by examiner

FIG. 7

| | PIXEL/ADC | ISP | Codec UNIT | POWER CONSUMPTION RELATIVE VALUE |
|---|---|---|---|---|
| TIME OF INSTALLATION | ALL PIXELS | ALL PIXELS | LOW COMPRESSION | 1 |
| MONITORING MODE | ADD IN UNITS OF AREA | INACTIVE | INACTIVE | 0.001 |
| PARTIAL IMAGE OUTPUT MODE | ALL PIXELS ONLY ON MOTION AREA | ALL PIXELS ONLY ON MOTION AREA | LOW COMPRESSION ONLY ON MOTION AREA | 0.1 TO 0.9 |
| FULL IMAGE OUTPUT MODE | ALL PIXELS | ALL PIXELS | LOW COMPRESSION | 1 |

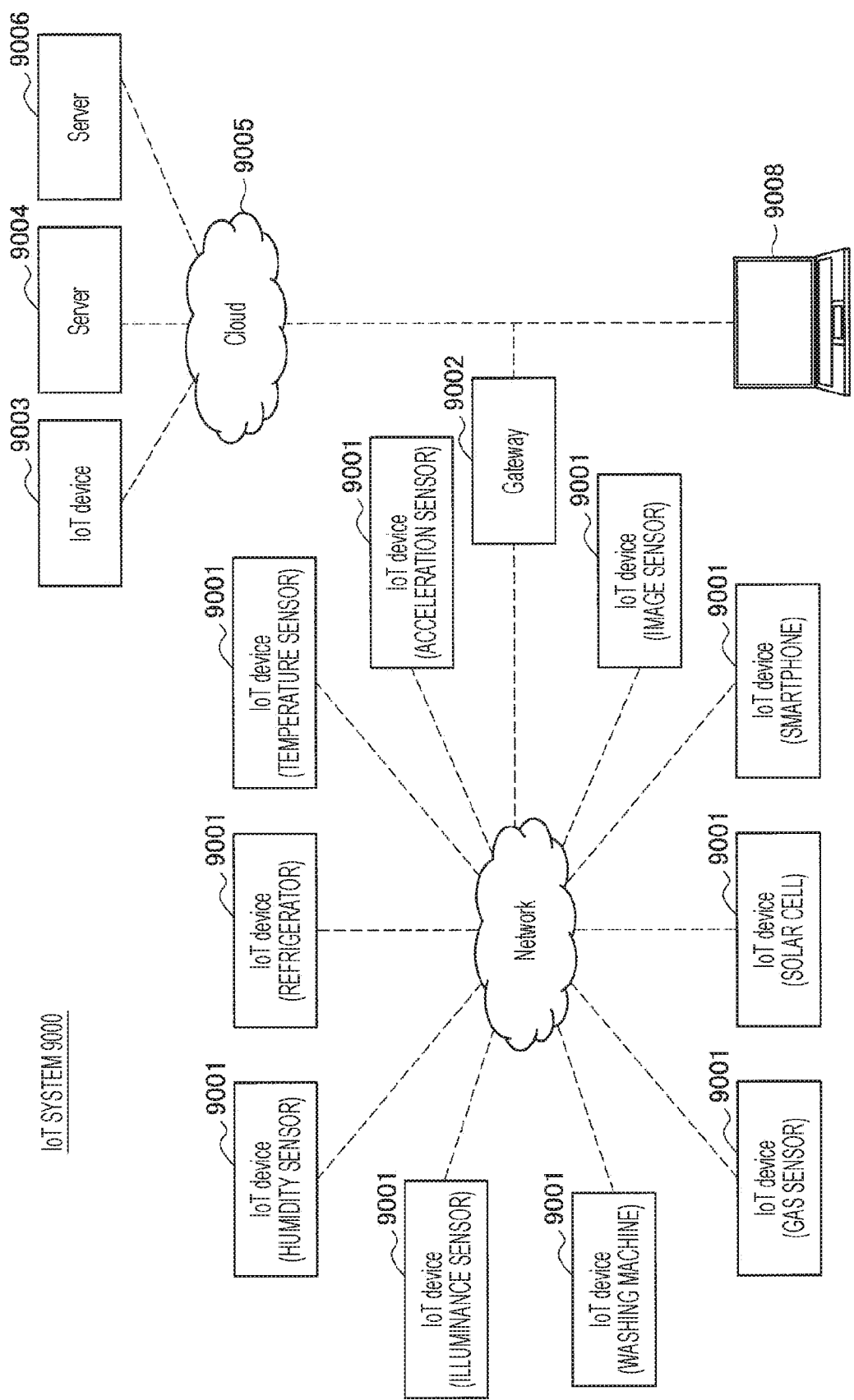

IMAGE CAPTURING DEVICE, IMAGE CAPTURING METHOD, AND IMAGE CAPTURING SYSTEM

CROSS REFERENCE TO RELATED APPLICATIONS

This application is a U.S. National Phase of International Patent Application No. PCT/JP2018/031126 filed on Aug. 23, 2018, which claims priority benefit of Japanese Patent Application No. JP 2017-218999 filed in the Japan Patent Office on Nov. 14, 2017. Each of the above-referenced applications is hereby incorporated herein by reference in its entirety.

TECHNICAL FIELD

The present disclosure relates to an image capturing device, an image capturing method, and an image capturing system.

BACKGROUND ART

In recent years, various image capturing devices have been developed. For example, an image capturing device which compresses image data of an area with motion at a first compression ratio and compresses image data corresponding to an area without motion at a second compression ratio, which is a higher compression ratio than the first compression ratio, has been disclosed (see Patent Document 1, for example). According to such an image capturing device, image data corresponding to an area with motion can be compressed with a higher image quality than image data corresponding to an area without motion.

In addition, an image capturing device which switches an operation mode between a first mode and a second mode has been disclosed (see Patent Document 2, for example). In the first mode, a digital signal (image data) is generated on the basis of an analog signal obtained by image capturing. On the other hand, in the second mode, the digital signal processing circuit is not driven while no difference is detected in the analog signal, and the operation mode transitions to the first mode in a case where a difference is detected in the analog signal.

CITATION LIST

Patent Document

Patent Document 1: Japanese Patent Application Laid-Open No. 2004-200739
Patent Document 2: Japanese Patent Application Laid-Open No. 2016-208116

SUMMARY OF THE INVENTION

Problems to be Solved by the Invention

However, it is desirable to provide a technique capable of further reducing the power consumption of the image capturing device.

Solutions to Problems

According to the present disclosure, an image capturing device including: a motion determination unit that determines the presence/absence of motion in a plurality of pixels on the basis of an addition signal of the plurality of pixels to obtain a motion determination result; and a transmission control unit that controls whether or not to transmit image data corresponding to at least the plurality of pixels on the basis of the motion determination result is provided.

According to the present disclosure, an image capturing method including: determining the presence/absence of motion in a plurality of pixels on the basis of an addition signal of the plurality of pixels to obtain a motion determination result; and controlling whether or not to transmit image data corresponding to at least the plurality of pixels on the basis of the motion determination result by a processor is provided.

According to the present disclosure, an image capturing system including: a motion determination unit that determines the presence/absence of motion in a plurality of pixels on the basis of an addition signal of the plurality of pixels to obtain a motion determination result; and a transmission control unit that controls whether or not to transmit image data corresponding to at least the plurality of pixels on the basis of the motion determination result is provided.

Effects of the Invention

As described above, according to the present disclosure, a technique capable of further reducing the power consumption of an image capturing device is provided. It is to be noted that the above effects are not necessarily restrictive, and any of the effects presented in the present description or other effects that can be understood from the present description may be achieved together with or in place of the above effects.

BRIEF DESCRIPTION OF DRAWINGS

FIG. 7 is a diagram presenting an example of a state of each block in each operation mode.

FIG. 14 is a diagram illustrating an example of a schematic configuration of an IoT system to which the technique according to the present disclosure can be applied.

MODE FOR CARRYING OUT THE INVENTION

Figure 1:
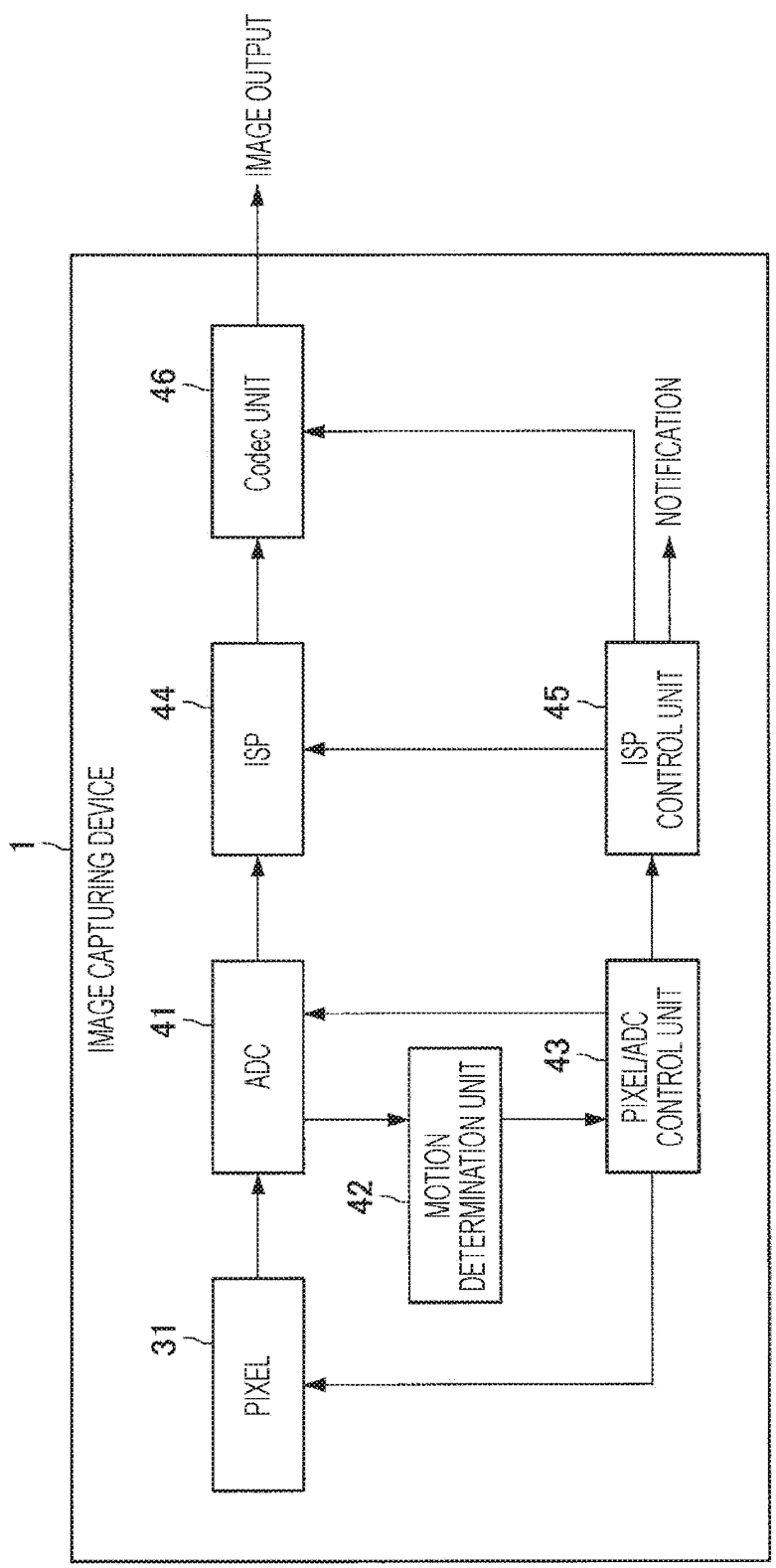
FIG. 1 is a diagram illustrating a configuration example of an image capturing device according to an embodiment of the present disclosure.

A preferred embodiment of the present disclosure will be described below in detail with reference to the accompanying drawings. It is to be noted that in the present description and drawings, components having substantially the same functional configuration are given the same reference numerals, and thus redundant description thereof will be omitted.

In addition, in the present description and drawings, there is a case where a plurality of components having substantially the same or similar functional configuration is distinguished by the same reference numerals followed by different numerals. However, only the same reference numerals are given in a case where it is not necessary to particularly distinguish among the plurality of individual components having substantially the same or similar functional configuration. In addition, there is a case where similar components of different embodiments are distinguished by the same reference numerals followed by different alphabets. However, only the same reference numerals are given in a case where it is not necessary to particularly distinguish among the individual similar components.

It is to be noted that the description will be given in the following order.

0. Outline
1. Details of the embodiment
1.1. Configuration example of image capturing device
1.1.1. Configuration example of image sensor
1.1.2. Pixel configuration example of image sensor
1.1.3. Functional configuration example of other blocks
1.1.4. Detailed functional description
2. Various modifications
3. Application examples
4. Conclusions <0. Outline>

First, an outline of an embodiment of the present disclosure will be described. An event-driven driving system technique that contributes to low power consumption of cameras has been developed. The event-driven driving system may be a mechanism in which the operation mode changes when any change is detected in units of frame in the viewing angle of the camera. An event-driven driving system camera usually operates in an illuminometer mode that consumes less power. Then, when detecting a partial change in illuminance due to motion or the like, the event-driven driving system camera transitions to an all-pixel operation mode, and returns to the illuminometer mode upon completion of transmission of image data of all pixels.

There is a case where with such a control, the event-driven driving system camera can be driven for several months with one coin-sized battery. For example, an event-driven driving system camera transmits captured image data to a center by Long Term Evolution (LTE), wireless Local Area Network (LAN), Bluetooth (registered trademark), or the like, and the image data transmitted to the center can be used secondarily.

As described above, low power transmission utilizing characteristics of an event-driven driving system camera is desirable in an output interface. However, no specific proposal has been made for such low power transmission so far. One measure for reducing power consumption is to reduce the amount of transmitted data. However, if the amount of transmitted data is reduced, there is a tradeoff that the resolution deteriorates, and hence realization of a system with high resolution and low power is required.

The outline of the embodiment of the present disclosure has been described above.

<1. Details of the Embodiment>

The embodiment of the present disclosure will be described below in detail.

[1.1. Configuration Example of Image Capturing Device]

First, a configuration example of an image capturing device according to the embodiment of the present disclosure will be described.

FIG. 1 is a diagram illustrating a configuration example of the image capturing device according to the embodiment of the present disclosure. As illustrated in FIG. 1, an image capturing device 1 according to the embodiment of the present disclosure includes a pixel 31, an analog/digital converter (hereinafter, also referred to as an "ADC") 41, a motion determination unit 42, a pixel/ADC control unit 43, an image signal processor (hereinafter, also referred to as an "ISP") 44, an ISP control unit 45, and a codec unit 46. It is to be noted that although only one pixel 31 is illustrated in FIG. 1 for the sake of convenience, a plurality of pixels 31 is actually present on the imaging surface.

Figure 2:
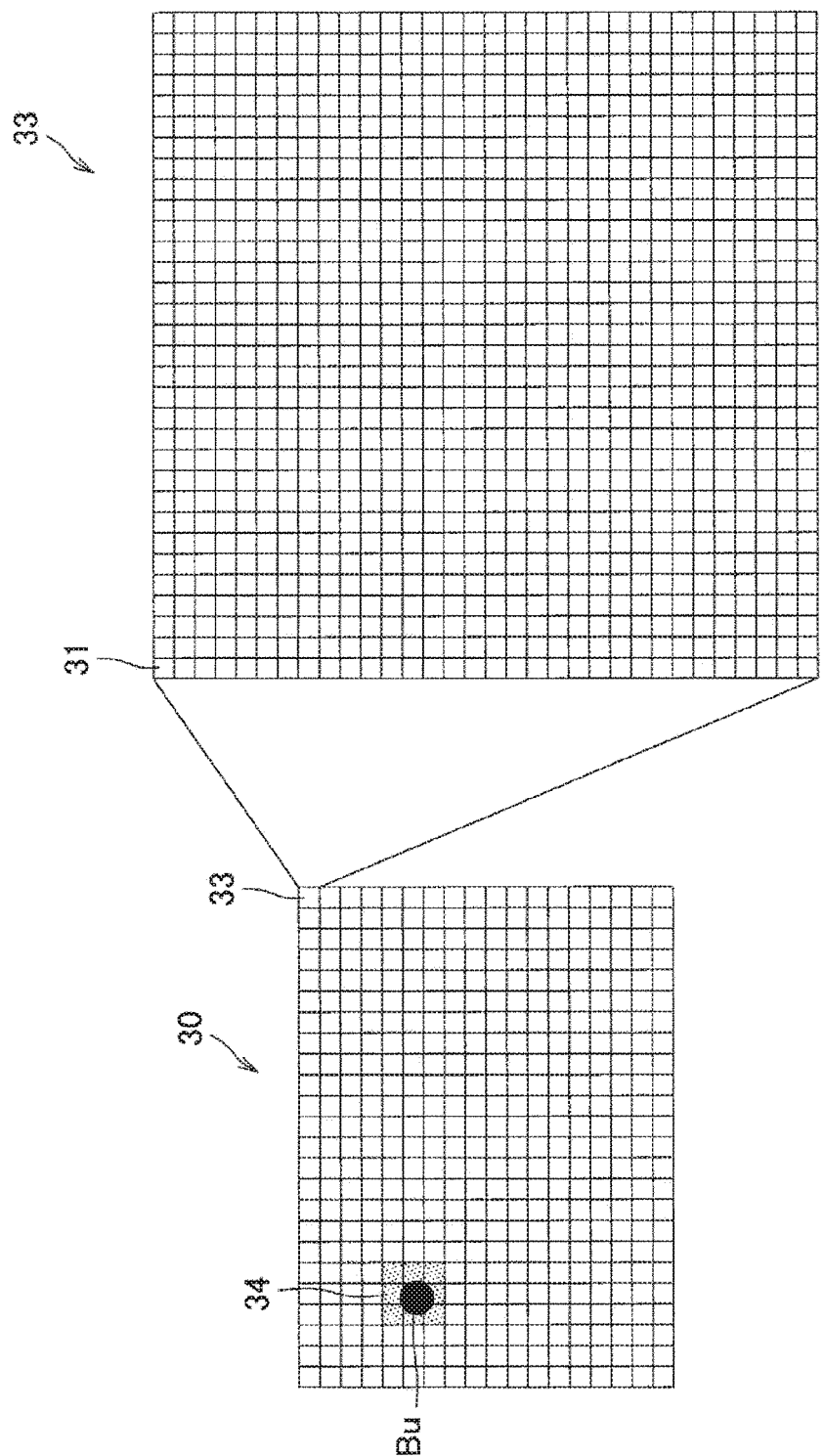
FIG. 2 is a diagram illustrating a configuration example of an imaging surface.

The pixel 31 will be described. FIG. 2 is a diagram illustrating a configuration example of the imaging surface. A pixel array constitutes one unit (area) by a predetermined number of pixels arranged in an array. Here, the predetermined number of pixels may be one pixel or a plurality of pixels. In the following description, a case where the predetermined number of pixels is a plurality of pixels will be mainly described. More specifically, in the example illustrated in FIG. 2, an area 33 includes 32 pixels in the vertical direction×32 pixels in the horizontal direction. However, the number of pixels in the vertical direction and the number of pixels in the horizontal direction in the area 33 are not particularly limited.

In addition, as illustrated in FIG. 2, a plurality of the areas 33 is arranged in a lattice shape, thereby providing an imaging surface 30. The number of areas in the vertical direction and the number of areas in the horizontal direction are not particularly limited. Here, presence/absence of motion can be determined in units of area. For example, in a case where a moving subject is captured by the imaging surface 30, it is determined that one or more areas are areas with motion. In FIG. 2, a plurality of areas (three vertical× three horizontal areas) where a moving subject Bu is captured is determined as an area 34 with motion.

<1.1.1. Configuration Example of Image Sensor>

Figure 3:
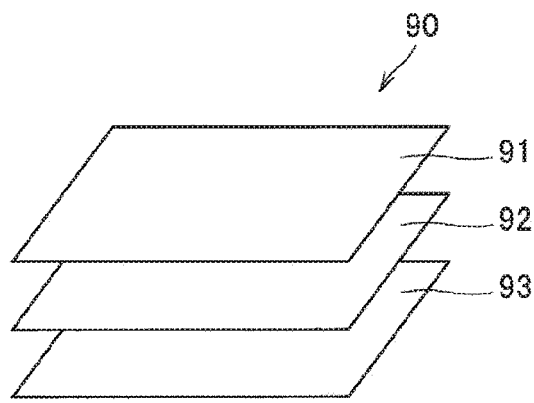
FIG. 3 is a diagram illustrating a configuration example of an image sensor.

FIG. 3 is a diagram illustrating a configuration example of the image sensor. As illustrated in FIG. 3, an image sensor 90 includes a sensor board 91, a signal processing board 92, and a memory board 93. The sensor board 91 is provided with the imaging surface 30 constituted of N areas in the vertical direction×N areas in the horizontal direction. The signal processing board 92 is provided with the ADC 41, the ISP 44, the codec unit 46, and the like. The memory board 93 is provided with a memory.

The embodiment of the present disclosure mainly assumes a case where a 3-layer stacked complementary metal oxide semiconductor (CMOS) image sensor structure (CIS structure) is employed as the structure of the image sensor 90, as illustrated in FIG. 3. However, the structure of the image sensor 90 is not limited to such a structure.

For example, the image sensor 90 may not have the memory board 93. In addition, the embodiment of the present disclosure mainly assumes a case where the ADC 41 and the ISP 44 are provided on the same board (signal processing board 92). However, the ADC 41 and the ISP 44 may be provided on different boards.

In addition, the embodiment of the present disclosure mainly assumes a case where, as the structure of the image sensor 90, a structure (area parallel architecture) in which the sensor board 91, the signal processing board 92, and the memory board 93 are provided in parallel corresponding to each of the N×N areas is adopted. According to such a structure, various processing described later can be executed for each area.

<1.1.2. Pixel Configuration Example of Image Sensor>

Figure 4:
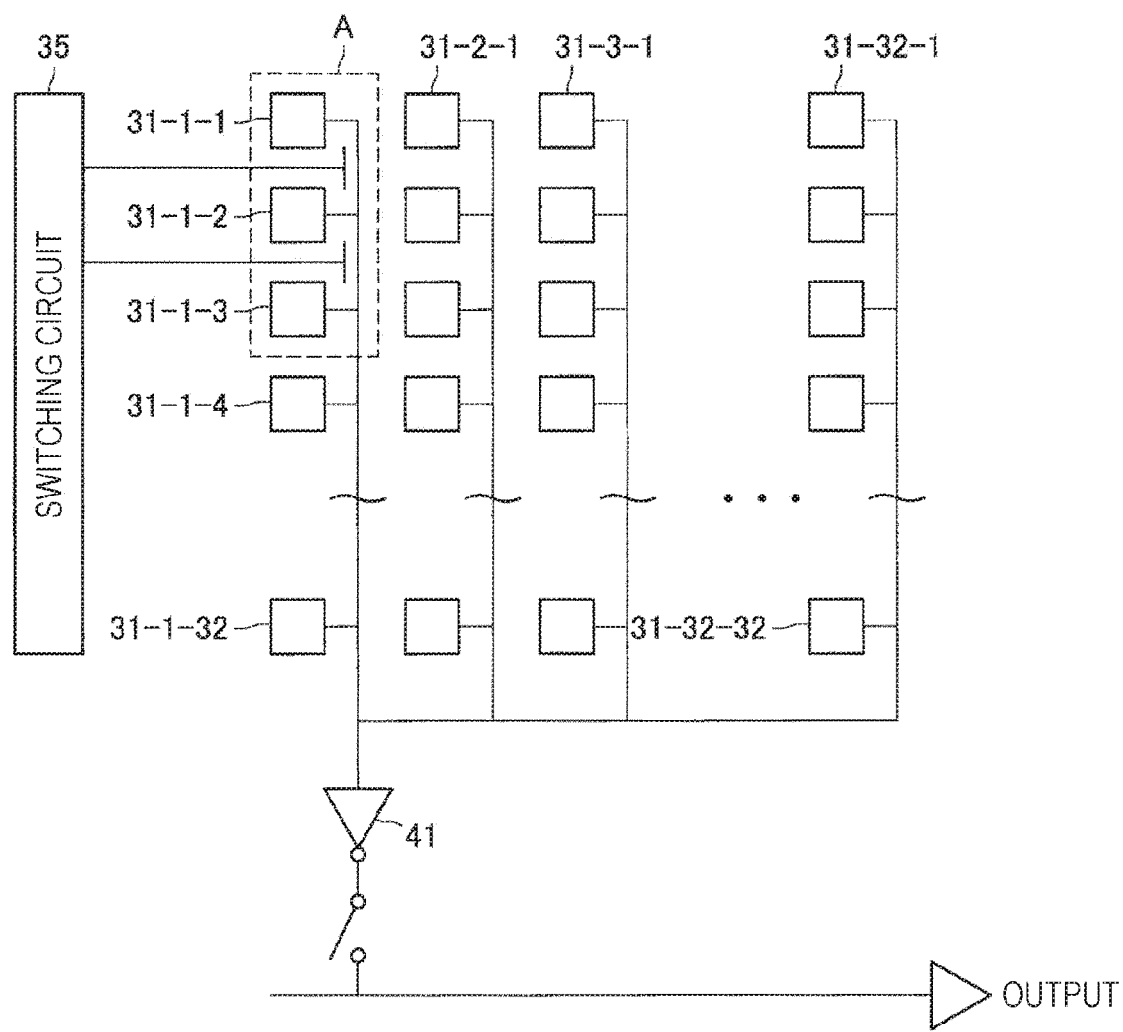
FIG. 4 is a diagram illustrating a configuration example of a pixel array included in the image sensor according to the embodiment of the present disclosure.

Subsequently, a configuration example of the pixel array of the image sensor according to the embodiment of the present disclosure will be described. FIG. 4 is a diagram illustrating the configuration example of the pixel array included in the image sensor according to the embodiment of the present disclosure. A pixel array constitutes one unit (area) by a predetermined number of pixels arranged in an array. In the example illustrated in FIG. 4, the pixel array includes 32 pixels in the vertical direction×32 pixels in the horizontal direction (pixel 31-1-1 to pixel 31-32-32).

It is to be noted that in the following description, there is a case where each of the pixels 31-1-1 to 31-32-32 is referred to simply as the "pixel 31" in a case where it is not necessary to distinguish them from one another.

As described above, the image sensor includes the sensor board 91, the signal processing board 92, and the memory board 93. On the other hand, as illustrated in FIG. 4, the image sensor includes the pixel array (pixel 31-1-1 to pixel 31-32-32), a switching circuit 35, and the ADC 41. The pixel array (pixel 31-1-1 to pixel 31-32-32) is provided on the sensor board 91. The ADC 41 is provided on the signal processing board 92. The switching circuit 35 is provided on the signal processing board 92.

The switching circuit 35 can switch the operation mode between a mode in which pixel signals of the individual pixels 31-1-1 to 31-32-32 are collectively read and output to the ADC 41 and a mode in which image signals of the individual pixels 31-1-1 to 31-32-32 are sequentially read by one pixel at a time and output to the ADC 41. The switching of the operation mode by the switching circuit 35 can be executed under the control of the pixel/ADC control unit 43.

In a case where the pixel signals of the individual pixels 31-1-1 to 31-32-32 are collectively read and output to the ADC 41, the ADC 41 converts an addition signal of each of the pixel signals of the pixels 31-1-1 to 31-32-32 into a digital signal. On the other hand, in a case where the pixel signals of the individual pixels 31-1-1 to 31-32-32 are sequentially read by one pixel at a time and output to the ADC 41, the ADC 41 sequentially converts the pixel signal of each of the pixels 31-1-1 to 31-32-32 into a digital signal.

Figure 5:
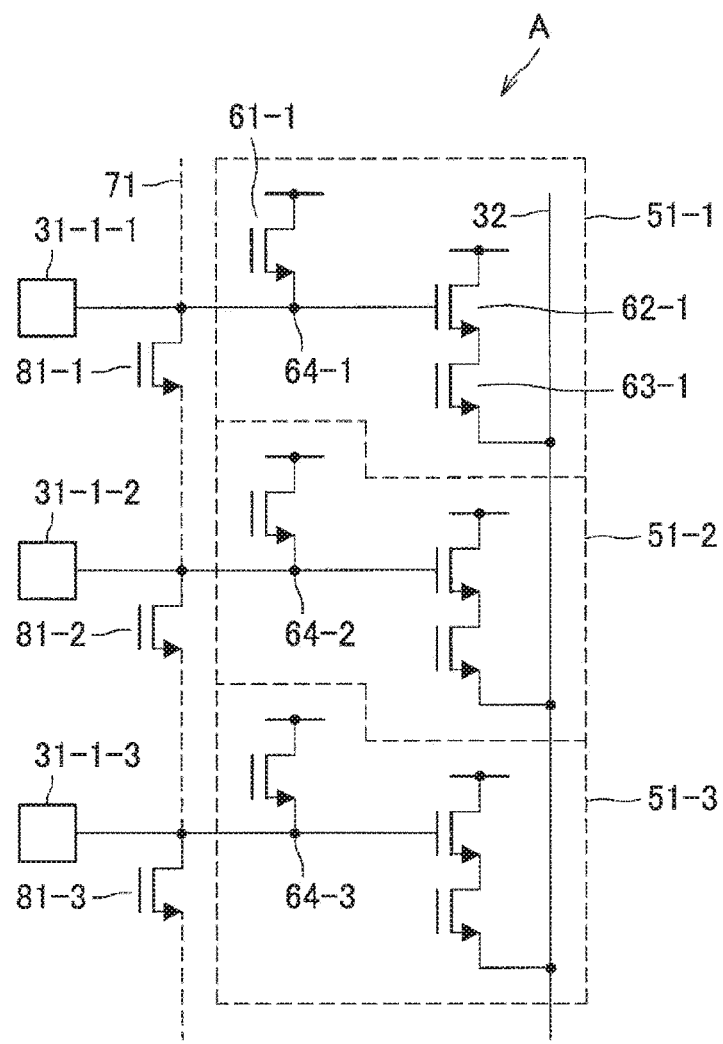
FIG. 5 is an enlarged diagram of a pixel group A illustrated in FIG. 4.

FIG. 5 is an enlarged diagram of a pixel group A illustrated in FIG. 4. As illustrated in FIG. 5, a floating diffusion (hereinafter, also referred to as "FD") connection wire 71 that connects FD 64 of each of the plurality of pixels 31 to each other is provided. In addition, a switch 81 for connecting the FD connection wire 71 is arranged between rows of the pixels 31. Then, the number of times of reading is reduced by switching the combination of on/off of the switch 81 in accordance with the required resolution.

Figure 6:
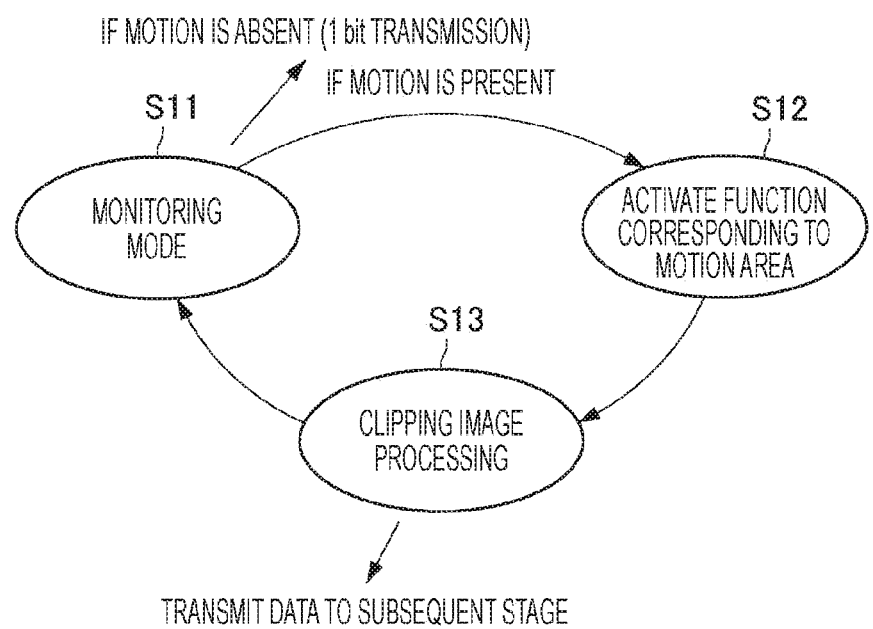
FIG. 6 is a diagram illustrating a state transition of the image capturing device.

In the example illustrated in FIG. 6, the pixels 31-1-1 to 31-1-3 are connected to a same vertical signal line 32, and the pixels 31-1-1 to 31-1-3 are provided with pixel circuits 51-1 to 51-3. The pixel circuit 51-1 includes a reset (RST) transistor 61-1, an amplification transistor 62-1, a selection (SEL) transistor 63-1, and an FD 64-1.

It is to be noted that in the example illustrated in FIG. 5, only in the pixel circuit 51-1, the reset (RST) transistor 61-1, the amplification transistor 62-1, the selection (SEL) transistor 63-1, and the FD 64-1 are given the reference numerals. Then, these reference numerals are omitted for the other pixel circuits 51 (pixel circuit 51-2 and pixel circuit 51-3). Also in the following description, reference numerals are omitted as necessary.

The RST transistor 61 is a transistor which is opened/closed when a photodiode of each pixel is reset or when the FD 64 is reset. The amplification transistor 62 has a gate connected to the FD 64, amplifies the reference potential or signal potential at the FD 64, and outputs the amplified potential as a pixel signal to the selection (SEL) transistor 63. The select (SEL) transistor 63 opens/closes on the basis of a selection signal SEL, and outputs and transfers the pixel signal amplified by the amplification transistor 62 to the vertical signal line 32.

In addition, although not illustrated, the pixel 31 is provided with a photodiode and a transfer (TRG) transistor. Opening/closing of the transfer (TRG) transistor resets the photodiode or transfers the charge accumulated in the photodiode to the FD 64 in accordance with opening/closing of the reset (RST) transistor. Here, the pixel circuit 51 may include four transistors as described above, but may also include other transistors, for example, may also include three transistors not including the transfer (TRG) transistor.

In addition, the pixel circuit 51-2 and the pixel circuit 51-3 have the similar configuration as that of the pixel circuit 51-1. The FD connection wire 71 is provided with switches 81-1 to 81-3 that connect the FDs 64-1 to 64-3 of the pixels 31-1-1 to 31-1-3. Then, the FD connection wire 71 is connected by turning on/off the switches 81-1 to 81-3, and FD addition can be realized in a range over the pixels 31-1-1 to 31-1-3.

The switching circuit 35 generates control signals such as a transfer signal TRG for controlling the opening/closing of the transfer (TRG) transistor, a reset signal RST for controlling the opening/closing of the reset (RST) transistor 61, and a selection signal SEL for controlling the opening/closing of the selection transistor 63. The switching circuit 35 controls the operation of the pixel circuit 51 in units of row on the basis of these control signals.

<1.1.3. Functional Configuration Example of Other Blocks>

Referring back to FIG. 1, the description will be continued. The ADC 41 converts the pixel signal (analog signal) transferred from the pixel 31 into a digital signal. More specifically, the ADC 41 can perform conversion processing (hereinafter, also referred to as "AD conversion processing") of an image signal (analog signal) captured by the entire imaging surface (all pixels) into a digital signal in units of pixel or it can do the same in units of area. The pixel/ADC control unit 43 can control whether to cause the ADC 41 to execute AD conversion processing in units of pixel or in units of area.

The ISP 44 includes an image processing processor such as a digital signal processor (DSP), for example. The ISP 44 executes predetermined signal processing on the digital signal output from the ADC 41. The ISP 44 performs the predetermined signal processing in units of pixel, but may perform the processing on all pixels or only on a specific area. The ISP control unit 45 can control which of the all pixels or the specific area to execute the signal processing for.

The signal processing executed by ISP 44 is not particularly limited. For example, the signal processing may include clamping processing for clamping the black levels of R, G, and B to a predetermined level for image signals, correction processing between the color channels of R, G, and B, and the like. Alternatively, the signal processing may include demosaic processing by which the image data corresponding to each pixel has all the R, G, and B color components. Alternatively, the signal processing may include processing of generating (separating) a luminance (Y) signal and a color (C) signal from image data of R, G, and B.

The codec unit 46 includes an image processing processor such as a central processing unit (CPU) or a graphics processing unit (GPU). The codec unit 46 encodes the image data output from the ISP 44. The embodiment of the present disclosure mainly assumes a case where the codec unit 46 performs encoding processing for transmission on image data. However, the codec unit 46 may perform encoding processing for recording on image data. When the codec unit 46 performs encoding of image data, compression to the image data is performed. The ISP control unit 45 can control the degree of compression of the image data by the codec unit 46.

The image data after encoded by the codec unit 46 is transmitted to a subsequent stage of the image capturing device 1 by an unillustrated communication device. Any device may be connected to the subsequent stage of the image capturing device 1. For example, a recording device that records image data may be connected to the subsequent stage of the image capturing device 1, or a display that displays the image data may be connected to the subsequent stage of the image capturing device 1. The image data transmitted to the subsequent stage corresponds to all pixels or a specific area. The ISP control unit 45 can control which of the image data of all pixels or the image data of the specific area to transmit.

The motion determination unit 42, the pixel/ADC control unit 43, and the ISP control unit 45 may be present in an unillustrated control unit. The unillustrated control unit includes a microcomputer (arithmetic processing device) including a CPU, a read only memory (ROM), a random access memory (RAM), a flash memory, and the like. The CPU controls the overall image capturing device 1 in a comprehensive manner by executing programs stored in the ROM, the flash memory, and the like. As a work area for various types of data processing by the CPU, the RAM is used for temporary storage of data, programs, and the like. The ROM and the flash memory (non-volatile memory) are used for storage of an operating system (OS) for the CPU to control each part, programs for various types of operations, firmware, and the like.

It is to be noted that the functions of the motion determination unit 42, the pixel/ADC control unit 43, and the ISP control unit 45 will be described later in detail.

The image capturing device 1 can be mounted on various devices. For example, the image capturing device 1 may be mounted on a smartphone or may be mounted on a mobile phone. Alternatively, the image capturing device 1 may be mounted on a tablet terminal, may be mounted on a head-mounted display, or may be mounted on a digital camera. Alternatively, the image capturing device 1 may be mounted on a personal computer (PC).

<1.1.4. Detailed Functional Description>

Subsequently, detailed functions of the image capturing device 1 according to the embodiment of the present disclosure will be described. In the embodiment of the present disclosure, the motion determination unit 42 determines the presence/absence of motion in the plurality of pixels on the basis of an addition signal of the plurality of pixels to obtain a motion determination result. Then, the ISP control unit 45 can function as an example of the transmission control unit that controls whether or not to transmit image data corresponding to at least the plurality of pixels on the basis of the motion determination result. According to such a configuration, since the presence/absence of motion is determined for a plurality of pixels collectively, it is possible to further reduce the power consumption of the image capturing device 1.

More specifically, the motion determination unit 42 determines the presence/absence of motion in the entire image for each area, and the ISP control unit 45 controls, for each area, whether or not to transmit image data on the basis of the motion determination result. According to such a configuration, since the presence/absence of motion is determined collectively for the area, it is possible to further reduce the power consumption of the image capturing device 1.

For example, in a case where it is determined that an area with motion (hereinafter, also referred to as a "motion area") is not present, i.e., if it is determined that only an area without motion (hereinafter, also referred to as a "non-motion area") is present, the operation mode transitions to the first mode (hereinafter, also referred to as a "monitoring mode") in which image data is not transmitted to the subsequent stage. On the other hand, in a case where it is determined that a motion area is present, the operation mode transitions to a mode in which image data corresponding to at least the motion area is transmitted to the subsequent stage.

The modes in which image data corresponding to at least the motion area is transmitted to the subsequent stage can include the second mode (hereinafter, also referred to as a "partial image output mode") in which image data corresponding to the motion area is transmitted to the subsequent stage but image data corresponding to the non-motion area is not transmitted to the subsequent stage, and a third mode (hereinafter, also referred to as a "full image output mode") in which image data corresponding to the entire image (all pixels) is transmitted to the subsequent stage.

According to such a configuration, since in the monitoring mode, the image data is not transmitted to the subsequent stage, it is possible to further reduce the power consumption of the image capturing device 1. In a case of receiving the entire image (all pixels), the subsequent stage holds the entire image. In a case of receiving only the image data corresponding to the motion area, it is only required for a part corresponding to the motion area of the entire image already held to be overwritten with the received image data. Even if image data corresponding to the non-motion area cannot be obtained, it is considered that no major inconvenience occurs for the subsequent stage if only image data corresponding to the motion area, which is a relatively important area, can be obtained.

The motion area and the non-motion area may be determined in any manner. For example, the motion determination unit 42 may determine that an area where an inter-frame difference value of the addition signal exceeds a first threshold value is a motion area. On the other hand, the motion determination unit 42 may determine that an area where the inter-frame difference value of the addition signal falls below a second threshold value is a non-motion area. The first threshold value and the second threshold value may be the same or may be different.

Here, as illustrated in FIG. 4, a case where a method (digital method) of determining the presence/absence of motion on the basis of the inter-frame difference value of the signal after AD conversion of the addition signal by the ADC 41 is employed is assumed. For example, the motion determination unit 42 may write a converted signal corresponding to the (n-1)th frame to the memory, read the converted signal corresponding to the (n-1)th frame from the memory when the converted signal corresponding to the nth frame is obtained, and determine the presence/absence of motion on the basis of a difference value of the converted signal between the (n-1)th frame and the nth frame. However, as will be described later, another method (analog method) may be employed.

It is to be noted that in the initial setting of the image capturing device 1, the subsequent stage does not yet hold the entire image, and hence the operation mode may be set to the full image output mode. Thereafter, the operation mode may transition from the full image output mode to the monitoring mode. In addition, there can be a subject which moves greatly in the long term even if there is not much motion per unit time. Accordingly, the operation mode may transition to the full image output mode at predetermined intervals. Thereafter, the operation mode may transition from the full image output mode to the monitoring mode.

FIG. 6 is a diagram illustrating a state transition of the image capturing device 1. The operation mode of the image capturing device 1 is set to the full image output mode in the initial setting of the image capturing device 1. Thereafter, the operation mode transitions to a monitoring mode S11. In the monitoring mode, the motion determination unit 42 determines the presence/absence of motion. Then, in a case where a motion area is not present, the ISP control unit 45 notifies the subsequent stage of information indicating that a motion area is not present (i.e., it is operating normally). The absence of a motion area can be represented by a small data amount of one to several bits.

On the other hand, in a case where a motion area is present, the operation mode transitions to the partial image output mode or the full image output mode. Here, a case where the operation mode transitions to the partial image output mode is assumed. In the partial image output mode, the ISP control unit 45 activates a function corresponding to the motion area (S12). Due to this, the signal processing by the ISP 44 and the encoding processing by the codec unit 46 are executed on the image data corresponding to the motion area.

When the signal processing by the ISP 44 and the encoding processing by the codec unit 46 are executed on the image data corresponding to the motion area, and the image data corresponding to the motion area is clipped (S13), the image data corresponding to the motion area is transmitted to the subsequent stage. Thereafter, in a case where the motion area is no longer present, the ISP control unit 45 makes the ISP 44 and the codec unit 46 inactive, and the operation mode transitions from the partial image output mode to the monitoring mode S11.

FIG. 7 is a diagram presenting an example of the state of each block in each operation mode. As described above, when the image capturing device 1 is installed, the operation mode is set to the full image output mode. Accordingly, as presented in FIG. 7, when the image capturing device 1 is installed, the pixel/ADC control unit 43 controls the ADC 41 so that the ADC 41 executes the AD conversion processing of the entire image in units of pixel.

In addition, as presented in FIG. 7, when the image capturing device 1 is installed, the ISP control unit 45 controls the ISP 44 so that the ISP 44 executes predetermined signal processing on the entire image. In addition, as presented in FIG. 7, when the image capturing device 1 is installed, the ISP control unit 45 controls the codec unit 46 so that the codec unit 46 executes encoding processing on the entire image. The compression ratio by the encoding processing is not limited (may be low compression as presented in FIG. 7).

As presented in FIG. 7, in the monitoring mode (i.e., in a case where the motion determination unit 42 determines that a motion area is not present), the pixel/ADC control unit 43 functions as an example of a conversion control unit that controls the ADC 41 so that the ADC 41 performs the AD conversion processing for the plurality of pixels constituting a non-motion area (i.e., each area of the entire image) collectively in the non-motion area.

In addition, as presented in FIG. 7, in the monitoring mode (i.e., in a case where the motion determination unit 42 determines that a motion area is not present), the ISP control unit 45 functions as an example of a first processing control unit that controls the ISP 44 so that the ISP 44 does not execute predetermined signal processing for a plurality of pixels constituting the non-motion area (i.e., each area of the entire image) (so that the predetermined signal processing is made inactive).

In addition, as presented in FIG. 7, in the monitoring mode (i.e., in a case where the motion determination unit 42 determines that a motion area is not present), the ISP control unit 45 functions as an example of a second processing control unit that controls the codec unit 46 so that the codec unit 46 does not execute encoding processing for a plurality of pixels constituting the non-motion area (i.e., each area of the entire image) (so that the encoding processing is made inactive).

As presented in FIG. 7, in the partial image output mode (i.e., in a case where the motion determination unit 42 determines that a motion area is present), the pixel/ADC control unit 43 functions as an example of the conversion control unit that controls the ADC 41 so that the ADC 41 performs the AD conversion processing for a plurality of pixels constituting the motion area in units of pixel. In such a case, the pixel/ADC control unit 43 is only required to control the ADC 41 so that the ADC 41 does not execute the AD conversion processing for a plurality of pixels constituting the non-motion area.

In addition, as presented in FIG. 7, in the partial image output mode (i.e., in a case where the motion determination unit 42 determines that a motion area is present), the ISP control unit 45 functions as an example of the first processing control unit that controls the ISP 44 so that the ISP 44 executes the predetermined signal processing for the plurality of pixels constituting the motion area. In such a case, the ISP control unit 45 is only required to control the ISP 44 so that the ISP 44 does not execute the predetermined signal processing for the plurality of pixels constituting the non-motion area (so that the predetermined signal processing is made inactive).

In addition, as presented in FIG. 7, in the partial image output mode (i.e., in a case where the motion determination unit 42 determines that a motion area is present), the ISP control unit 45 functions as an example of the second processing control unit that controls the codec unit 46 so that the codec unit 46 executes the encoding processing for the plurality of pixels constituting the motion area. The compression ratio by the encoding processing is not limited (may be low compression as presented in FIG. 7). In such a case, the ISP control unit 45 is only required to control the codec unit 46 so that the codec unit 46 does not execute the encoding processing for the plurality of pixels constituting the non-motion area (so that the encoding processing is made inactive).

As presented in FIG. 7, in the full image output mode (i.e., in a case where the motion determination unit 42 determines that a motion area is present), similarly to when the image capturing device 1 is installed, the pixel/ADC control unit 43 controls the ADC 41 so that the ADC 41 executes the AD conversion processing of the entire image in units of pixel.

In addition, as presented in FIG. 7, in the full image output mode (i.e., in a case where the motion determination unit 42 determines that a motion area is present), similarly to when the image capturing device 1 is installed, the ISP control unit 45 controls the ISP 44 so that the ISP 44 executes predetermined signal processing on the entire image. In addition, as presented in FIG. 7, in the full image output mode (i.e., in a case where the motion determination unit 42 determines that a motion area is present), similarly to when the image capturing device 1 is installed, the ISP control unit 45 controls the codec unit 46 so that the codec unit 46 executes encoding processing on the entire image. The compression ratio by the encoding processing is not limited (may be low compression as presented in FIG. 7).

FIG. 7 also illustrates power consumption relative values of the image capturing device 1 in each of the time of installation, the monitoring mode, the partial image output mode, and the full image output mode. With reference to FIG. 7, when the image capturing device 1 is installed and when in the full image output mode, the entire image is subjected to the AD conversion by the ADC 41, the predetermined signal processing by the ISP 44, and the encoding processing by the codec unit 46, and hence the power consumption relative value is set to "1".

On the other hand, in the partial image output mode, all pixels only in the motion area are subjected to the AD conversion by the ADC 41, the predetermined signal processing by the ISP 44, and the encoding processing by the codec unit 46. Therefore, with reference to FIG. 7, the power consumption relative value in the partial image output mode is set to be "0.1" to "0.9", which is lower than the power consumption relative value "1" when in the installation of the image capturing device 1 and in the full image output mode. It is to be noted that the power consumption relative value in the partial image output mode can change depending on the size of the motion area (size with respect to the entire image of the subject).

Furthermore, in the monitoring mode, the predetermined signal processing by the ISP 44 and the encoding processing by the codec unit 46 are not executed. Then, in the monitoring mode, the AD conversion by the ADC 41 is also executed collectively for the area.

For example, in a case where AD conversion is executed on 32 pixels in the vertical direction×32 pixels in the horizontal direction collectively for the area (in a case of the monitoring mode), the power consumption of the ADC 41 is about 1/1000 as compared with a case where the AD conversion is executed in units of pixel (in a case of the full image output mode). Since the power consumption in the ADC tends to increase particularly in the sensor chip, the effect of executing the AD conversion collectively for the area is significant. With reference to FIG. 7, the power consumption relative value in the monitoring mode is "0.001", which is further lower than the power consumption relative value "0.1" to "0.9" in the partial image output mode.

It is to be noted that FIG. 7 presents the partial image output mode and the full image output mode as operation modes of transition destinations in a case where it is determined that a motion area is present. Here, in a case where it is determined that a motion area is present, the operation mode may transition to either the partial image output mode or the full image output mode. That is, the pixel/ADC control unit 43 can function as an example of the conversion control unit that determines whether the target of the AD conversion processing is only a plurality of pixels constituting the motion area or is the entire image on the basis of predetermined information in a case where it is determined that the motion area is present.

For example, the predetermined information may include setting information by the user. That is, in a case where the user has set the target of the AD conversion processing to only the motion area in a case where the motion area is present, the pixel/ADC control unit 43 may transition the operation mode to the partial image output mode in a case where it is determined that the motion area is present. On the other hand, in a case where the user has set the target of the AD conversion processing to the entire image in a case where the motion area is present, the pixel/ADC control unit 43 may transition the operation mode to the full image output mode in a case where it is determined that the motion area is present.

For example, the predetermined information may include the size of the motion area (size with respect to the entire image of the subject). That is, in a case where it is determined that the motion area is present, and in a case where the size of the motion area (size with respect to the entire image of the subject) falls below the threshold value, the pixel/ADC control unit 43 may transition the operation mode to the partial image output mode. On the other hand, in a case where it is determined that the motion area is present, and in a case where the size of the motion area (size with respect to the entire image of the subject) exceeds the threshold value, the pixel/ADC control unit 43 may transition the operation mode to the full image output mode.

Figure 8:
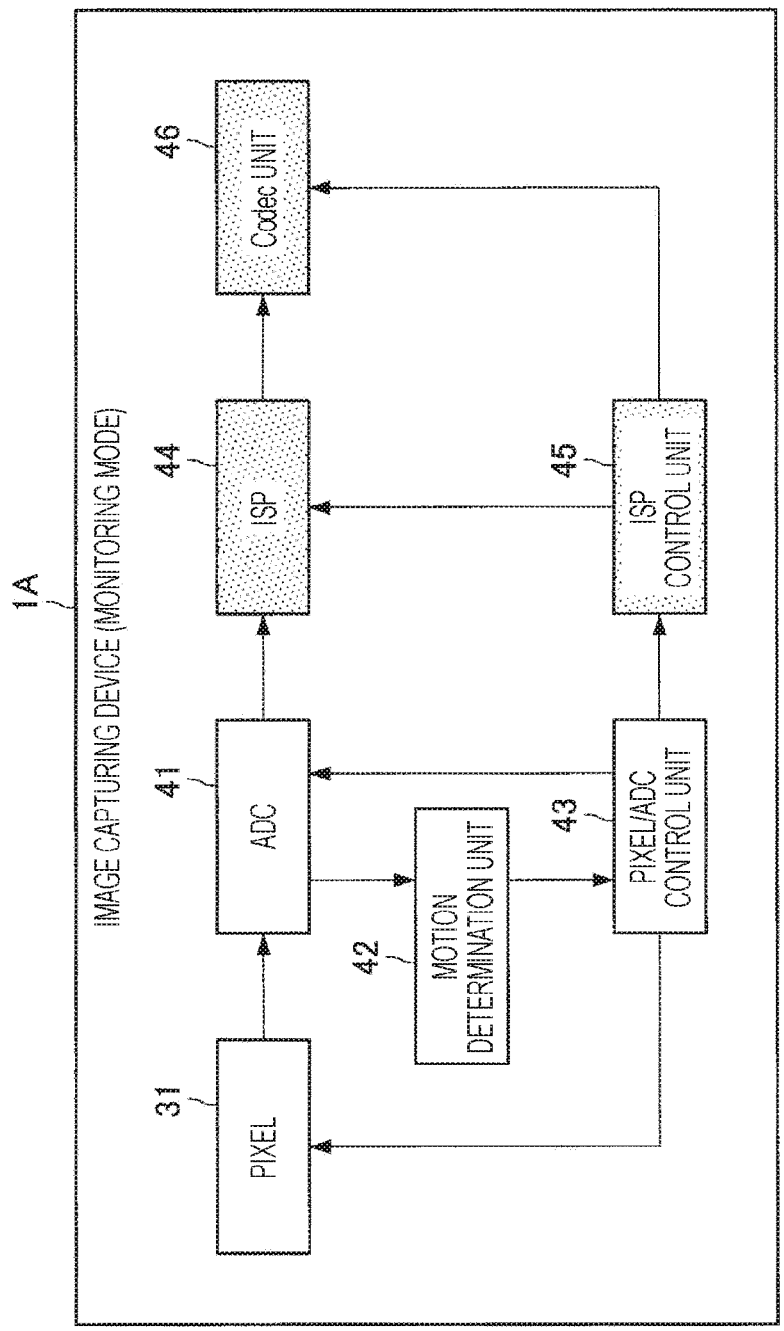
FIG. 8 is a diagram illustrating an example of the operation of each block in a monitoring mode.

FIG. 8 is a diagram illustrating an example of the operation of each block in the monitoring mode. As described above, in an image capturing device 1A in the monitoring mode (i.e., in a case where the motion determination unit 42 determines that a motion area is not present), the pixel/ADC control unit 43 controls the ADC 41 so that the ADC 41 performs the AD conversion processing for the plurality of pixels constituting a non-motion area (i.e., each area of the entire image) collectively for the non-motion area. On the other hand, in the monitoring mode, the ISP 44, the ISP control unit 45, and the codec unit 46 are inactive. FIG. 8 illustrates these inactive blocks by solid fills.

Figure 9:
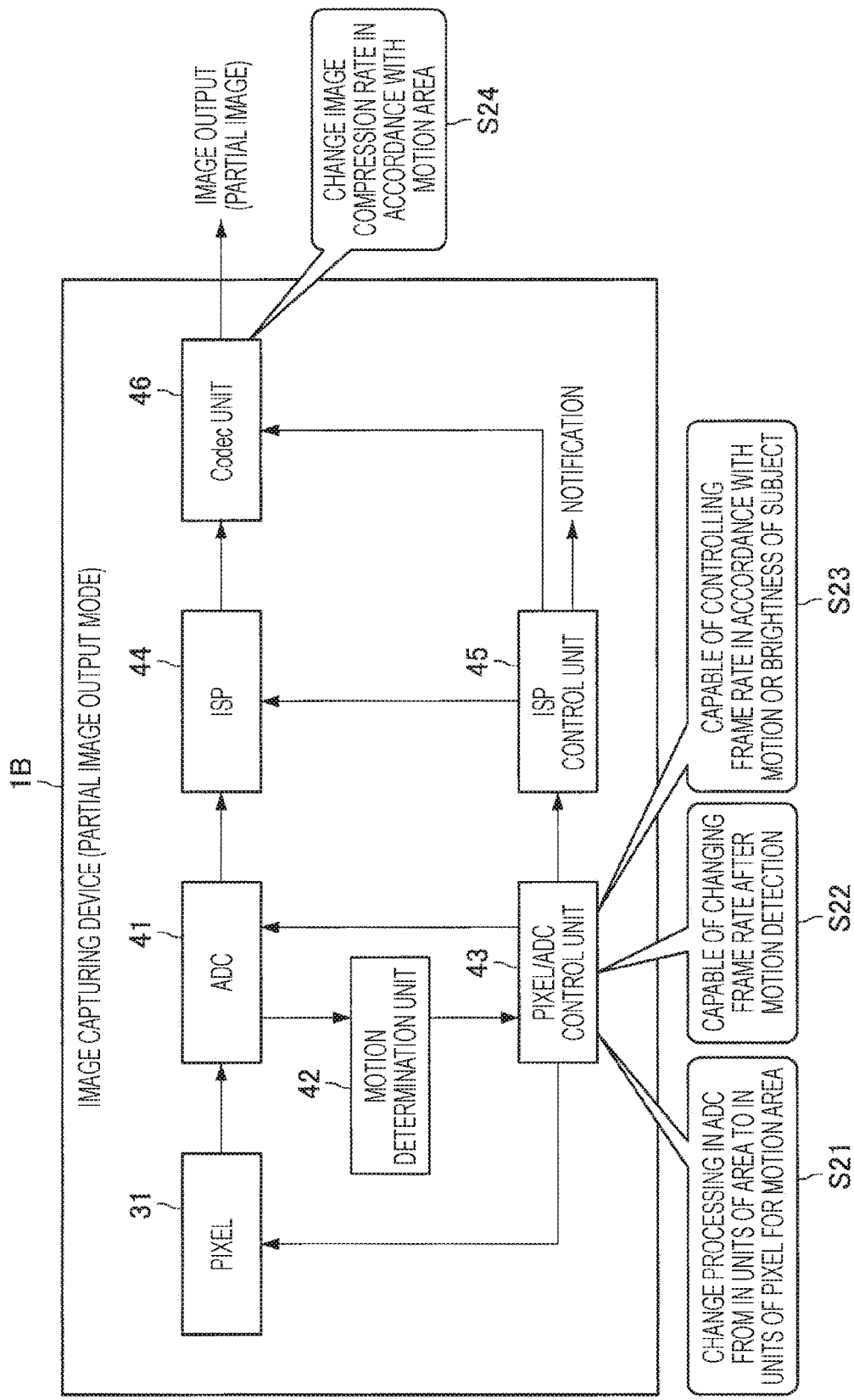
FIG. 9 is a diagram illustrating an example of the operation of each block in a partial image output mode.

FIG. 9 is a diagram illustrating an example of the operation of each block in the partial image output mode. As described above, in an image capturing device 1B in the partial image output mode (i.e., in a case where the motion determination unit 42 determines that a motion area is present), the pixel/ADC control unit 43 changes the AD conversion processing in the ADC 41 for the plurality of pixels constituting the motion area so as to be performed from in units of area to in units of pixel (S21).

In addition, the pixel/ADC control unit 43 may be able to change the frame rate after motion detection by the motion determination unit 42 (S22). More specifically, in the partial image output mode (i.e., in a case where the motion determination unit 42 determines that a motion area is present), the pixel/ADC control unit 43 can function as a pixel control unit that controls the frame rates of a plurality of pixels constituting the motion area in accordance with the size of the motion or the brightness of the subject having the motion (S23).

For example, in the partial image output mode (i.e., in a case where the motion determination unit 42 determines that a motion area is present), the pixel/ADC control unit 43 preferably increases the frame rate of the motion area as the motion of the motion area increases, thereby making it easier to capture the subject having a large motion. Alternatively, in the partial image output mode (i.e., in a case where the motion determination unit 42 determines that a motion area is present), the pixel/ADC control unit 43 preferably reduces the frame rate of the motion area as the subject in the motion area is darker, thereby making it easier to capture a dark subject.

In addition, in the partial image output mode (i.e., in a case where the motion determination unit 42 determines that a motion area is present), the ISP control unit 45 can function as the second processing control unit that controls the compression ratio by encoding processing executed for a plurality of pixels constituting the motion area on the basis of the motion area (S24). For example, in the partial image output mode (i.e., in a case where the motion determination unit 42 determines that a motion area is present), the ISP control unit 45 requires high quality image data with large motion of the motion area, and hence the compression ratio by the encoding processing of the motion area may be reduced.

Figure 10:
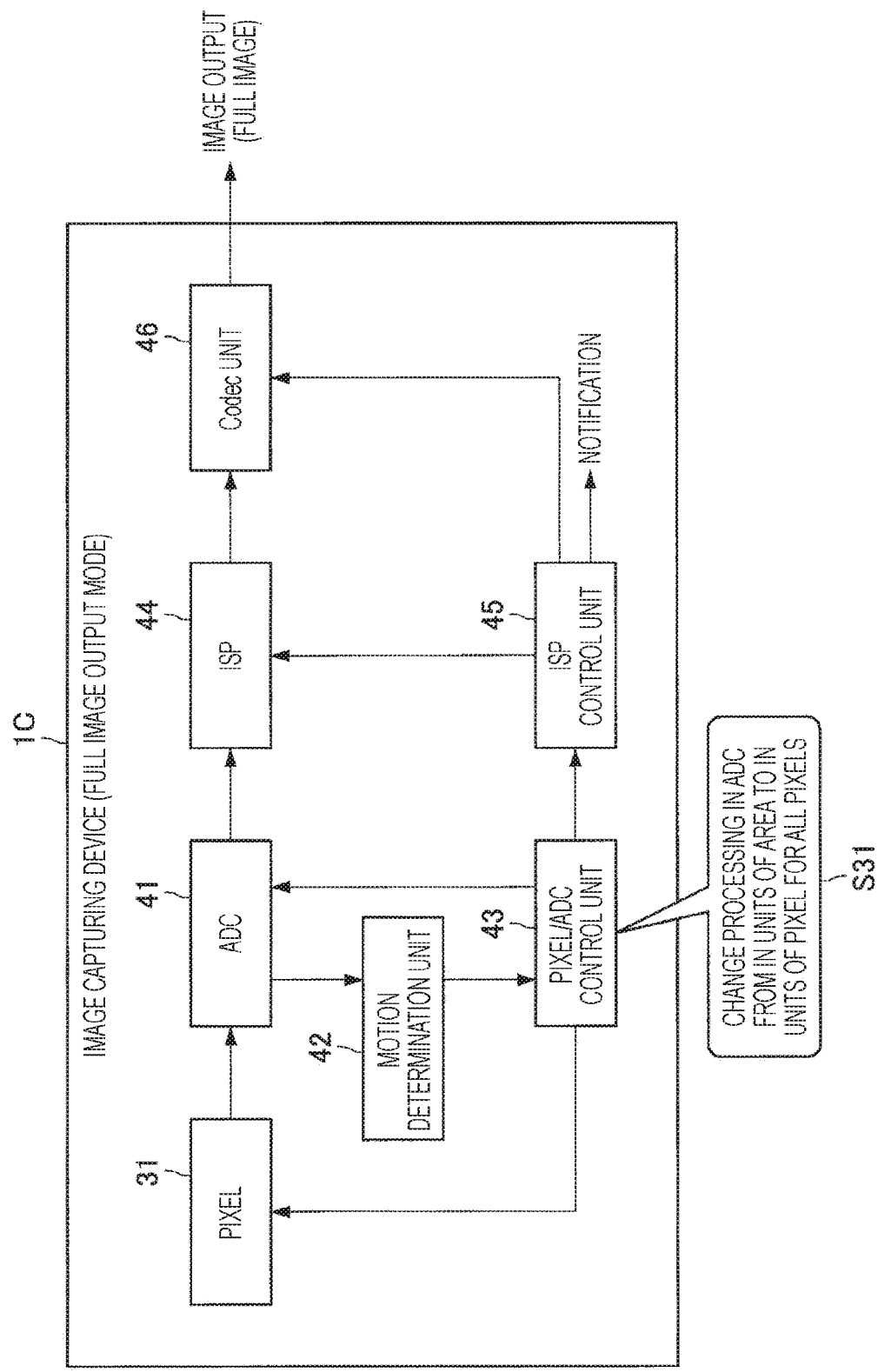
FIG. 10 is a diagram illustrating an example of the operation of each block in a full image output mode.

FIG. 10 is a diagram illustrating an example of the operation of each block in the full image output mode. As described above, in the full image output mode of an image capturing device 1C (i.e., in a case where the motion determination unit 42 determines that a motion area is present), the pixel/ADC control unit 43 changes the AD conversion processing in the ADC 41 for all pixels (entire image) so as to be performed from in units of area to in units of pixel (S31).

As above, the detailed functions of the image capturing device 1 according to the embodiment of the present disclosure have been described.

<2. Various Modifications>

Figure 11:
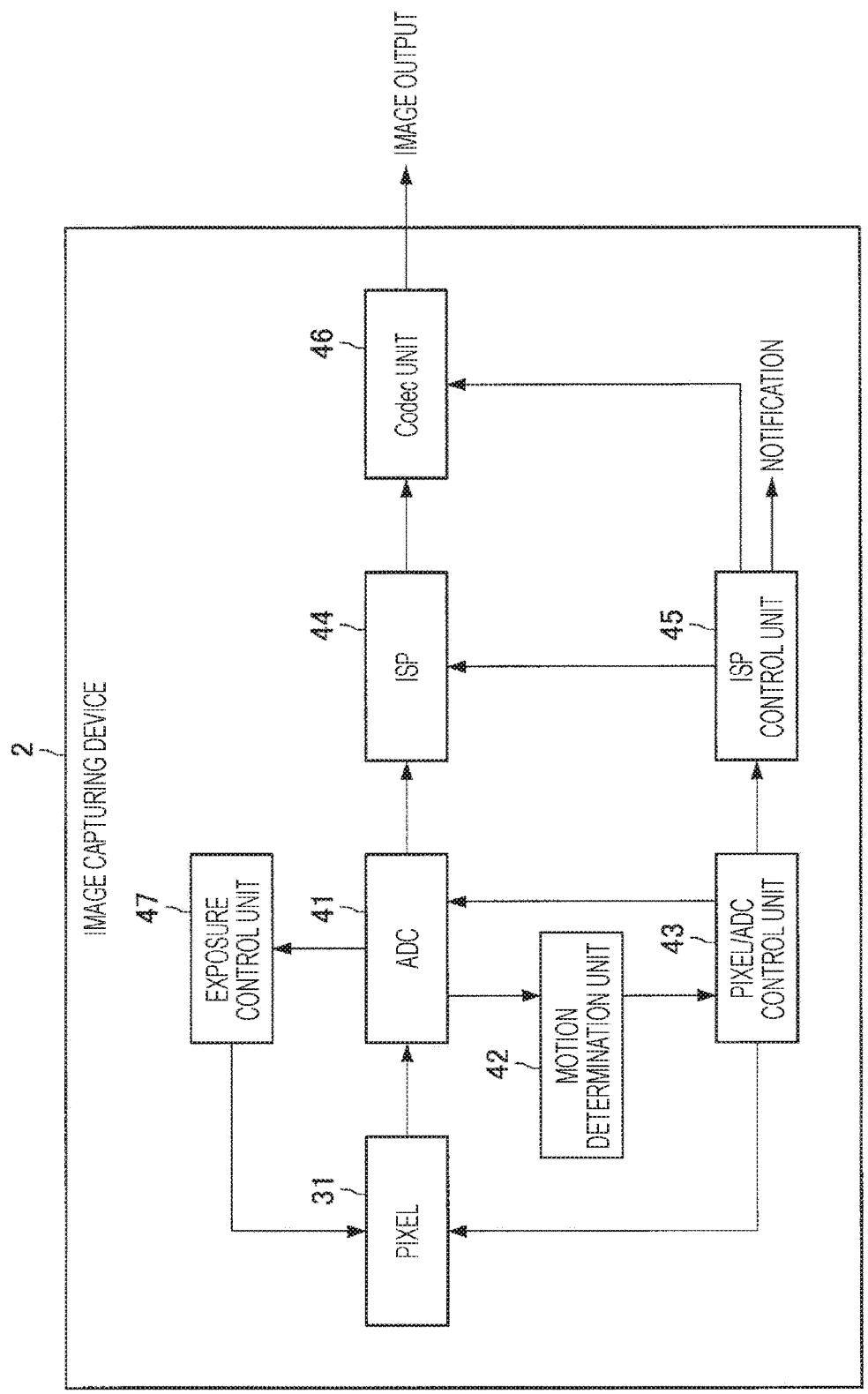
FIG. 11 is a block diagram illustrating a functional configuration example of an image capturing device according to a first modification.

Subsequently, various modifications will be described. FIG. 11 is a block diagram illustrating the functional configuration example of the image capturing device according to a first modification. As illustrated in FIG. 11, an image capturing device 2 according to the first modification further includes an exposure control unit 47 in comparison with the image capturing device 1 described above. In a case where the motion determination unit 42 determines that a motion area is present, the exposure control unit 47 may control the exposure time corresponding to a plurality of pixels constituting the motion area in accordance with the brightness of the plurality of pixels.

More specifically, in a case where the motion determination unit 42 determines that a motion area is present, the exposure control unit 47 preferably increases the exposure time corresponding to the motion area as the motion area is darker, thereby making it easier to capture the subject in the dark motion area.

In addition, in the above description, a case where a method (digital method) of determining the presence/absence of motion on the basis of the inter-frame difference value of the signal after AD conversion of the addition signal by the ADC 41 of the plurality of pixels is employed has been mainly described. However, as a second modification, a method (analog method) of determining the presence/absence of motion on the basis of the inter-frame difference value of the signal before AD conversion of an addition signal of a plurality of pixels from the analog signal to the digital signal may be employed.

Figure 12:
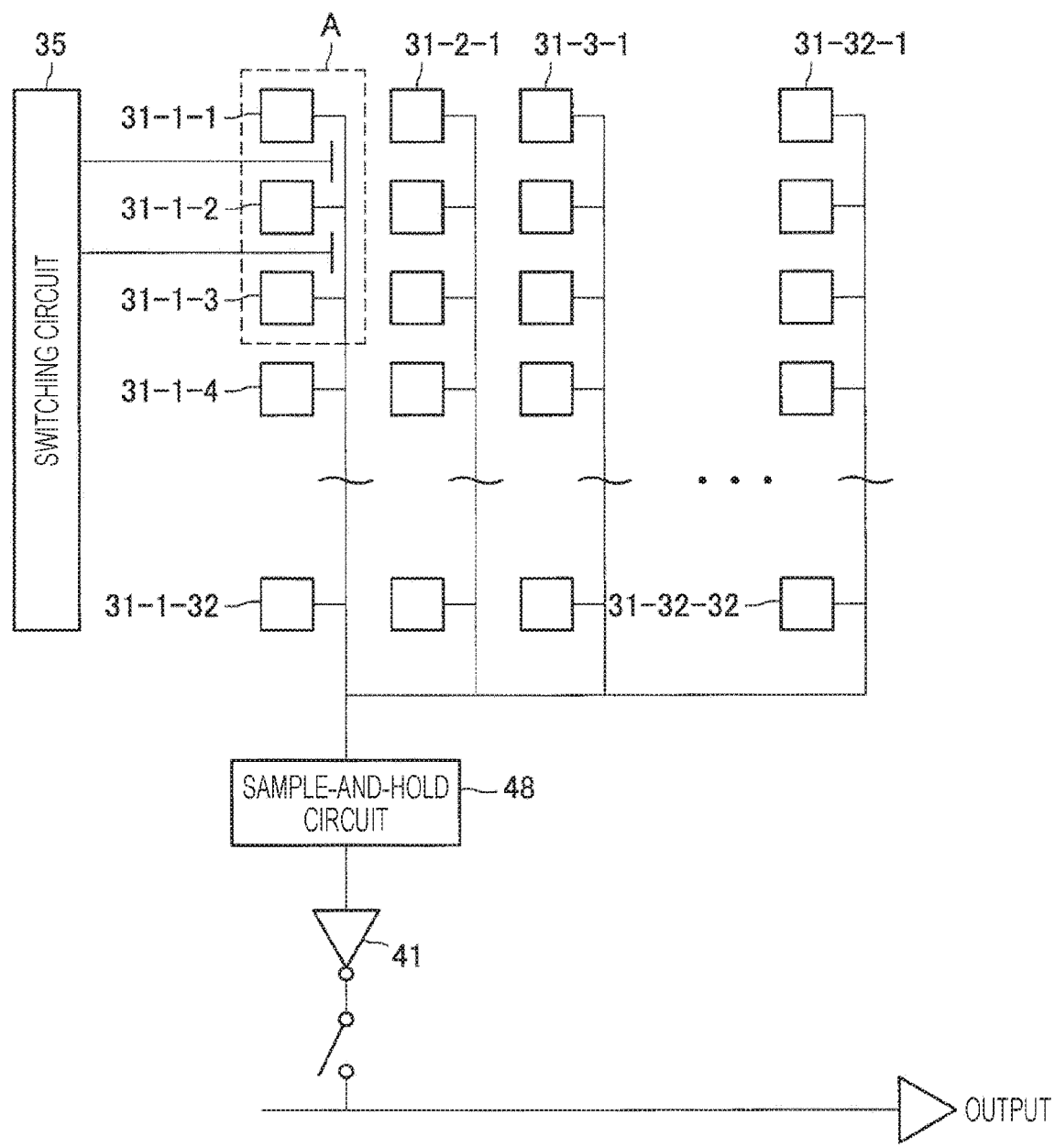
FIG. 12 is a diagram illustrating a configuration example of a pixel array included in an image sensor according to a second modification.
Figure 13:
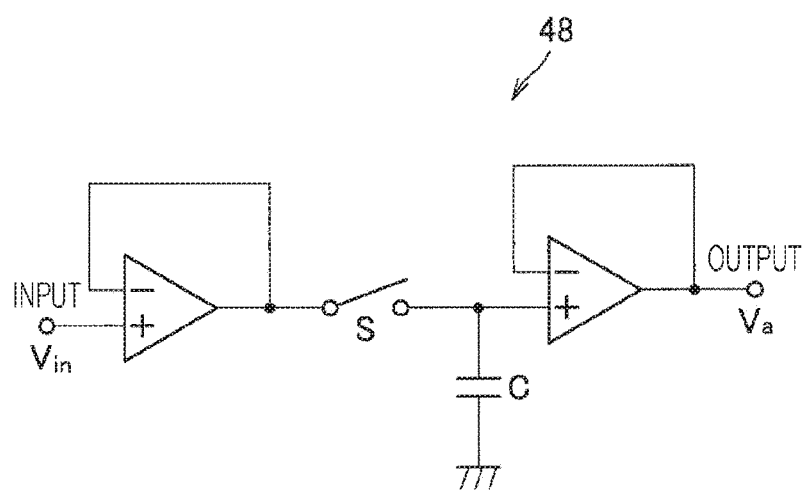
FIG. 13 is a diagram illustrating a configuration example of a sample-and-hold circuit.

FIG. 12 is a diagram illustrating a configuration example of a pixel array included in the image sensor according to the second modification. With reference to FIG. 12, a sample-and-hold circuit 48 is provided in a previous stage of the ADC 41. FIG. 13 is a diagram illustrating a configuration example of the sample-and-hold circuit 48. The sample-and-hold circuit 48 reads, as a voltage value, an inter-frame difference value of a signal before conversion from the analog signal to the digital signal of an addition signal of a plurality of pixels. At this time, the motion determination unit 42 may determine the presence/absence of motion on the basis of the inter-frame difference value.

In addition, in the above description, a case where the AD conversion processing for the plurality of pixels constituting the motion area controlled so as to be performed in units of pixel in a case where it is determined that a motion area is present has been mainly described. However, instead of determining that the motion area is actually present, or in addition to a case of determining that the motion area is present, a change of the motion may be predicted, and on the basis of the prediction result of the change of the motion, it may be determined whether an area that changes to have motion is present.

At this time, in a case where the motion determination unit 42 determines that an area that changes to have motion is present, the pixel/ADC control unit 43 can function as the conversion control unit that controls the AD conversion processing for a plurality of pixels constituting an area that changes to have motion so as to be performed in units of pixel. Due to this, it is possible to enjoy an effect that a subject moving at high speed can be easily captured.

In the above description, a case where an area where the inter-frame difference value of the addition signal exceeds the first threshold value is determined to be a motion area and an area where the inter-frame difference value of the addition signal falls below the second threshold value is determined to be a non-motion area has been mainly described. At this time, a detection sensitivity of the motion area and the non-motion area may be variable by adding a circuit that allows the first threshold value and the second threshold value to be set on the basis of a user operation. It is to be noted that as described above, the first threshold value and the second threshold value may be the same or may be different.

In addition, as illustrated in FIG. 2, a case where the area 33 includes 32 pixels in the vertical direction×32 pixels in the horizontal direction has been mainly assumed. However, as described above, the number of pixels in the vertical direction and the number of pixels in the horizontal direction in the area 33 are not particularly limited. For example, the number of pixels in the vertical direction and the number of pixels in the horizontal direction in the area 33 can be variable in a multiplying manner by the wiring connecting between the areas.

In addition, in the above description, a case where the motion determination unit 42 determines the presence/absence of motion with respect to the entire image for each area has been mainly assumed. However, there may be a case where a position that can have motion is limited to specific position (e.g., road and the like). In such a case, the motion determination unit 42 may determine the presence/absence of motion for each area only for a position that can have motion. The position that can have motion may be settable by the user or may be obtained by machine learning on the basis of past image data.

<3. Application Examples>

The technique according to the present disclosure can be applied to a technique so-called "Internet of things" (IoT). The IoT is a mechanism in which an IoT device 9001, which is a "thing", is connected to another IoT device 9003, the Internet, a cloud 9005, and the like, and mutually controls by exchanging information. The IoT can be used in a variety of industries including agriculture, housing, automobiles, manufacturing, distribution, energy, and the like.

FIG. 14 is a diagram illustrating an example of a schematic configuration of an IoT system 9000 to which the technique according to the present disclosure can be applied. The IoT device 9001 includes various sensors such as a temperature sensor, a humidity sensor, an illuminance sensor, an acceleration sensor, a distance sensor, an image sensor, a gas sensor, a human detecting sensor, and the like. In addition, the IoT device 9001 may also include terminals such as a smartphone, a mobile phone, a wearable terminal, and a video game console. The IoT device 9001 is powered by an AC power source, a DC power source, a battery, a contactless power source, so-called energy harvesting, and the like. The IoT device 9001 can communicate by wire, wireless, proximity wireless communication, and the like. As a communication method, 3G/LTE (registered trademark), Wi-Fi (registered trademark), IEEE 802.15.4, Bluetooth (registered trademark), Zigbee (registered trademark), Z-Wave, and the like are preferably used. The IoT device 9001 may communicate by switching a plurality of these communication means.

The IoT device 9001 may form a one-to-one, star, tree, or mesh network. The IoT device 9001 may be connected to the external cloud 9005 either directly or through a gateway 9002. The IoT device 9001 is given an address by IPv4, IPv6, 6LoWPAN, and the like. Data collected from the IoT device 9001 is transmitted to the other IoT device 9003, a server 9004, the cloud 9005, and the like. The timing and frequency of transmitting data from the IoT device 9001 may be preferably adjusted, and data may be compressed and transmitted. Such data may be used as is, or the data may be analyzed by a computer 9008 by various means such as statistical analysis, machine learning, data mining, cluster analysis, discriminant analysis, combination analysis, and time series analysis. By using such data, it is possible to provide various services such as control, warning, monitoring, visualization, automation, and optimization.

The technique according to the present disclosure can also be applied to devices and services related to a home. The home IoT devices 9001 include a washing machine, a drying machine, a hair-dryer, a microwave oven, a dishwasher, a refrigerator, an oven, a rice cooker, a gas appliance, a fire alarm, a thermostat, an air conditioner, a television, a recorder, an audio device, a lighting device, a water heater, a hot-water server, a vacuum cleaner, an electric fan, an air purifier, a security camera, a lock, a door and shutter opener, a sprinkler, a toilet, a thermometer, a scale, a sphygmomanometer, and the like. Furthermore, the IoT devices 9001 may include a solar cell, a fuel cell, a storage battery, a gas meter, a power meter, and a distribution board.

As a communication method of the IoT device 9001 at home, a low power consumption type communication method is desirable. In addition, the IoT device 9001 may also communicate via Wi-Fi indoors and 3G/LTE (registered trademark) outdoors. An external server 9006 for controlling the IoT devices may be installed on the cloud 9005 to control the IoT device 9001. The IoT device 9001 transmits data such as the status of home appliances, temperature, humidity, power consumption, and the presence/absence of people and animals inside and outside the house. Data transmitted from the home appliances is accumulated in the external server 9006 via the cloud 9005. New services are provided on the basis of such data. Such the IoT device 9001 can be controlled by voice by using voice recognition technique.

In addition, by directly sending information from various types of home appliances to the television, it is possible to visualize the states of various types of home appliances. Moreover, various types of sensors judge the presence/absence of a resident, and send the data to the air conditioner, the light, and the like, thereby allowing their power sources to be turned on/off. Moreover, an advertisement can be displayed on a display provided to various types of home appliances via the Internet.

An example of the IoT system 9000 to which the technique according to the present disclosure can be applied has been described above. The technique according to the present disclosure can be preferably applied to the image capturing device 1 among the configurations described above.

<4. Conclusions>

As described above, according to the embodiment of the present disclosure, the image capturing device 1 including the motion determination unit 42 which determines the presence/absence of motion in a plurality of pixels on the basis of an addition signal of the plurality of pixels to obtain a motion determination result; and the ISP control unit 45 that controls whether or not to transmit image data corresponding to at least the plurality of pixels on the basis of the motion determination result is provided.

According to such a configuration, it is possible to further reduce the power consumption of the image capturing device. Specifically, in a case where there is no change in a monitor target area, it is possible to drastically reduce the power consumption by the AD conversion processing collectively for the area. In addition, according to such a configuration, the signal processing by the ISP needs to be executed only on the image data corresponding to the area where the change is detected, and hence the processing amount is drastically reduced and the power saving effect can be obtained. The image data corresponding to the important area where the change is detected is transmitted as high quality image data.

It is to be noted that in a case where the AD conversion processing is executed collectively for the area, the execution cycle of the AD conversion processing may be a normal frame rate (e.g., 60 fps). However, it is also possible to set the execution cycle of the AD conversion processing to a frame rate 1000 times in principle (e.g., 60,000 fps). In such a case, since it is possible to capture an object moving at a very high speed, it is also possible to obtain an effect equivalent to a global shutter.

While the preferred embodiment of the present disclosure has been described in detail with reference to the accompanying drawings, the technical scope of the present disclosure is not limited to such an example. It is obvious that a person ordinarily skilled in the art of the present disclosure can conceive of various modifications and variations within the scope of the technical idea set forth in the claims, and are also understood to naturally fall within the technical scope of the present disclosure.

For example, it is possible to create a program for causing hardware such as a CPU, a ROM, and a RAM incorporated in a computer to exhibit functions equivalent to those of the control unit described above. In addition, a computer-readable recording medium on which the program is recorded can also be provided.

In addition, the effects described in the present description are only illustrative or exemplary and not restrictive. That is, the technique according to the present disclosure can achieve other effects that are apparent to those skilled in the art from the present description, in addition to or in place of the above effects.

It is to be noted that the following configuration also falls within the technical scope of the present disclosure.

(1)

An image capturing device including:

a motion determination unit that determines a presence/absence of motion in a plurality of pixels on the basis of an addition signal of the plurality of pixels to obtain a motion determination result; and a transmission control unit that controls whether or not to transmit image data corresponding to at least the plurality of pixels on the basis of the motion determination result.

(2)

The image capturing device according to (1), in which the motion determination unit determines the presence/absence of the motion for each area including a plurality of pixels, and the transmission control unit controls, for each of the areas, whether or not to transmit the image data on the basis of the motion determination result.

(3)

The image capturing device according to (2), further including a conversion control unit that controls conversion processing from an analog signal to a digital signal of a plurality of pixels constituting an area with the motion so as to be performed in units of pixel in a case where it is determined that an area with the motion is present.

(4)

The image capturing device according to (3), in which in a case where it is determined that an area with the motion is not present, the conversion control unit controls the conversion processing for a plurality of pixels constituting an area without the motion so as to be performed collectively in the area without the motion.

(5)

The image capturing device according to (3) or (4), in which in a case where it is determined that an area with the motion is present, the conversion control unit controls the conversion processing of an entire image so as to be performed in units of pixel.

(6)

The image capturing device according to (2), further including a conversion control unit that determines, on the basis of predetermined information, whether a target of conversion processing from an analog signal to a digital signal is only a plurality of pixels constituting an area with the motion or is an entire image in a case where it is determined that an area with the motion is present.

(7)

The image capturing device according to (6), in which the predetermined information includes setting information by a user or a size of a subject having the motion.

(8)

The image capturing device according to (2), in which the motion determination unit determines, on the basis of a prediction result of a change of the motion, whether an area that changes to have the motion is present, and the image capturing device further includes a conversion control unit that controls conversion processing from an analog signal to a digital signal of a plurality of pixels constituting an area that changes to have the motion so as to be performed in units of pixel in a case where it is determined that an area that changes to have the motion is present.

(9)

The image capturing device according to any one of (2) to (8), further including a first processing control unit that controls predetermined signal processing on a plurality of pixels constituting an area with the motion to be executed in a case where it is determined that an area with the motion is present.

(10)

The image capturing device according to (9), in which in a case where it is determined that an area with the motion is not present, the first processing control unit controls the signal processing on a plurality of pixels constituting an area without the motion so as not to be executed.

(11)

The image capturing device according to any one of (2) to (10), further including a second processing control unit that controls encoding processing on a plurality of pixels constituting an area with the motion to be executed in a case where it is determined that an area with the motion is present.

(12)

The image capturing device according to (11), in which in a case where it is determined that an area with the motion is not present, the second processing control unit controls the encoding processing on a plurality of pixels constituting an area without the motion so as not to be executed.

(13)

The image capturing device according to (11) or (12), in which in a case where it is determined that an area with the motion is present, the second processing control unit controls, on the basis of an area with the motion, a compression ratio by the encoding processing executed on a plurality of pixels constituting the area with the motion.

(14)

The image capturing device according to any one of (2) to (13), further including a pixel control unit that controls a frame rate of a plurality of pixels constituting an area with the motion in accordance with a size of the motion or a brightness of a subject having the motion in a case where it is determined that an area with the motion is present.

(15)

The image capturing device according to any one of (2) to (14), further including an exposure control unit that controls an exposure time corresponding to a plurality of pixels constituting an area with the motion in accordance with a brightness of the plurality of pixels in a case where it is determined that an area with the motion is present.

(16)

The image capturing device according to any one of (2) to (15), in which in a case where it is determined that an area with the motion is not present, the transmission control unit outputs information indicating that an area with the motion is not present.

(17)

The image capturing device according to any one of (1) to (16), in which
the motion determination unit determines that an area where an inter-frame difference value of the addition signal exceeds a first threshold value is an area with the motion.

(18)

The image capturing device according to any one of (1) to (17), in which
the motion determination unit determines that an area where an inter-frame difference value of the addition signal falls below a second threshold value is an area without the motion.

(19)

An image capturing method including:
determining a presence/absence of motion in a plurality of pixels on the basis of an addition signal of the plurality of pixels to obtain a motion determination result; and
controlling whether or not to transmit image data corresponding to at least the plurality of pixels on the basis of the motion determination result by a processor.

(20)

An image capturing system including:
a motion determination unit that determines a presence/absence of motion in a plurality of pixels on the basis of an addition signal of the plurality of pixels to obtain a motion determination result; and
a transmission control unit that controls whether or not to transmit image data corresponding to at least the plurality of pixels on the basis of the motion determination result.

REFERENCE SIGNS LIST 1 (1A to 1C), 2 Image capturing device
30 Imaging surface
31 Pixel
33 Area
34 Area with motion
41 ADC
42 Motion determination unit
43 Pixel/ADC control unit
44 ISP
45 ISP control unit
46 Codec unit
47 Exposure control unit
48 Sample-and-hold circuit
90 Image sensor
91 Sensor board
92 Signal processing board
93 Memory board

The invention claimed is:

1. An image capturing device, comprising:
a motion determination unit configured to determine, for each area of a plurality of areas of an image, one of a presence of motion or an absence of the motion in a respective plurality of pixels of a corresponding area of the plurality of areas,
wherein the determination of the one of the presence of the motion or the absence of the motion for the each area is based on an addition signal of the respective plurality of pixels;
a conversion control unit configured to determine, in a case where the presence of the motion is determined in a first area of the plurality of areas, that a target of conversion processing from an analog signal to a digital signal is one of:
a first plurality of pixels that constitute the first area with the motion, or
an entirety of the image that includes the plurality of areas,
wherein the determination of the target of the conversion processing is based on one of a size of the first area with the motion or user setting information for the conversion processing; and
a transmission control unit configured to control, for each area of the plurality of areas one of transmission or non-transmission of image data corresponding to the respective plurality of pixels of the corresponding area, wherein the one of the transmission or the non-transmission of the image data is controlled based on determination of the target of the conversion processing.

2. The image capturing device according to claim 1, wherein the conversion control unit is further configured to control, in the case where the presence of the motion is determined in the first area, the conversion processing from the analog signal to the digital signal of the first plurality of pixels constituting the first area with the motion in units of pixel.

3. The image capturing device according to claim 2, wherein
in a case where the first area with the motion is absent in the image, the conversion control unit is further configured to control the conversion processing for a second plurality of pixels constituting a second area of the plurality of areas,
the second area is without the motion, and
the conversion processing is controlled collectively for the second plurality of pixels in the second area without the motion.

4. The image capturing device according to claim 2, wherein
in the case where the presence of the motion is determined in the first area, the conversion control unit is further configured to control, the conversion processing of the entirety of the image in the units of pixel.

5. The image capturing device according to claim 1, wherein
the motion determination unit is further configured to:
predict a change of the motion of a third plurality of pixels to obtain a prediction result; and
determine, based on the prediction result of the change of the motion, a presence of a third area of the plurality of areas that changes to have the motion, and
the conversion control unit is further configured to control, based on the presence of the third area that changes to have the motion, the conversion processing from the analog signal to the digital signal of the third plurality of pixels that constitute the third area in units of pixel.

6. The image capturing device according to claim 1, further comprising
a first processing control unit configured to control, in the case where the presence of the motion is determined in the first area, execution of a signal process on the first plurality of pixels that constitute the first area with the motion.

7. The image capturing device according to claim 6, wherein
the signal process is unexecuted, in a case where the first area with the motion is absent in the image on a second plurality of pixels constituting a second area without the motion, and
the plurality of areas includes the second area.

8. The image capturing device according to claim 1, further comprising
a second processing control unit configured to control, in the case where the presence of the motion is determined in the first area, execution of an encoding process on the first plurality of pixels constituting the first area with the motion.

9. The image capturing device according to claim 8, wherein
the encoding process is unexecuted, in a case where the first area with the motion is absent in the image on a second plurality of pixels constituting a second area without the motion, and
the plurality of areas includes the second area.

10. The image capturing device according to claim 8, wherein
in the case where the presence of the motion is determined in the first area, the second processing control unit is further configured to control, based on the first area with the motion, a compression ratio of the encoding process executed on the first plurality of pixels that constitute the first area with the motion.

11. The image capturing device according to claim 1, further comprising a pixel control unit configured to control, in the case where the presence of the motion is determined in the first area, a frame rate of the first plurality of pixels that constitute the first area with the motion, wherein
the frame rate is controlled based on at least one of a size of the motion or a brightness of a subject having the motion.

12. The image capturing device according to claim 1, further comprising an exposure control unit configured to control, in the case where the presence of the motion is determined in the first area, an exposure time corresponding to the first plurality of pixels that constitute the first area with the motion,
wherein the exposure time is controlled based on a brightness of the first plurality of pixels.

13. The image capturing device according to claim 1, wherein
in a case where the first area with the motion is absent in the image, the transmission control unit is further configured to output information indicating that the first area with the motion is absent.

14. The image capturing device according to claim 1, wherein the motion determination unit is further configured to determine the presence of the motion in the first area based on an inter-frame difference value of the addition signal that exceeds a first threshold value for the first area.

15. The image capturing device according to claim 1, wherein the motion determination unit is further configured to determine the absence of the motion in a second area of the plurality of areas based on an inter-frame difference value of the addition signal that is below threshold value for the second area.

16. An image capturing method, comprising:
determining, for each area of a plurality of areas of an image, one of a presence of motion or an absence of the motion in a respective plurality of pixels of a corresponding area of the plurality of areas,
wherein the determination of the one of the presence of the motion or the absence of the motion for the each area is based on an addition signal of the respective plurality of pixels;
determining, in a case where the presence of the motion is determined in a first area of the plurality of areas, that a target of conversion processing from an analog signal to a digital signal is one of:
the respective plurality of pixels that constitute the first area with the motion, or
an entirety of the image that includes the plurality of areas,
wherein the determination of the target of the conversion processing is based on one of a size of the first area with the motion or user setting information for the conversion processing; and
controlling, for each area of the plurality of areas, one of transmission or non-transmission of image data corresponding to the respective plurality of pixels of the corresponding area, wherein the one of the transmission or the non-transmission of the image data is controlled based on determination of the target of the conversion processing.

17. An image capturing system, comprising:
a motion determination unit configured to determine, for each area of a plurality of areas of an image, one of a presence of motion or an absence of the motion in a respective plurality of pixels of a corresponding area of the plurality of areas,
wherein the determination of the one of the presence of the motion or the absence of the motion for the each area is based on an addition signal of the respective plurality of pixels;
a conversion control unit configured to determine, in a case where the presence of the motion is determined in a first area of the plurality of areas, that a target of conversion processing from an analog signal to a digital signal is one of:
a first plurality of pixels that constitute the first area with the motion, or
an entirety of the image that includes the plurality of areas,
wherein the determination of the target of the conversion processing is based on one of a size of the first area with the motion or user setting information for the conversion processing; and
a transmission control unit configured to control, for each area of the plurality of areas, one of transmission or non-transmission of image data corresponding to the respective plurality of pixels of the corresponding area,
wherein the one of the transmission or the non-transmission of the image data is controlled based on determination of the target of the conversion processing.

* * * * *